Patented Jan. 15, 1952

2,582,867

UNITED STATES PATENT OFFICE 2,582,867

ALKYLIDENE-ALKOXYARYLALKYLAMINES AND PREPARATION THEREOF

Howard D. Hartough, Pitman, and Joseph J. Dickert, Jr., West Collingswood, N. J., assignors to Socony-Vacuum Oil Company, Incorporated, a corporation of New York No Drawing. Application May 27, 1948,
Serial No. 29,668

8 Claims. (Cl. 260—566)

The present invention relates to the aminoalkylation of alkoxy aromatic compounds and, more particularly, to the aminomethylation of alkoxybenzenes.

The aminomethylation of alkoxy aromatic compounds results in the formation of a formaldimine which may be represented by the general formula R′ORCH$_2$N=CH$_2$ wherein R is the residue of a mono- or polynuclear aromatic compound unsubstituted or substituted by a group which does not participate in the Mannich reactions and R′ is an alkyl group. In addition to the formaldimine there also is produced a disubstituted methane which may be represented by the formula

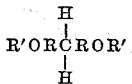

in which R and R′ have the significance indicated hereinbefore.

There have been no attempts to aminoalkylate alkoxy aromatic hydrocarbons reported in the literature although Decombe (Compt. rend., 196, 866 (1933)) has reported the reaction of 4-methoxyphenol with formaldehyde and methylamine and Kruber and Lauenstein have reported the preparation of o,o′-dianisylmethane when the corresponding phenol was treated with dimethylsulfate (Ber. 74B, 1693 (1941)). However, the preparation of the p,p′-dianisylmethane has not been reported in the literature. Accordingly, it is an object of the present invention to provide a means for aminoalkylating alkoxy aromatic compounds. It is another object of the present invention to provide a method for aminoalkylating alkoxybenzenes. It is a further object of the present invention to provide a method for aminomethylating alkoxybenzenes. It is also within the scope of the present invention to provide a means for producing disubstituted alkanes and aminoalkyl-alkoxy aromatic compounds. Other objects and advantages will become apparent from the following description.

Typical, but only illustrative and not limiting, of the alkoxy aromatic compounds which may be used in accordance with the principles of the present invention are the alkoxybenzenes such as anisole, phenetole, and the like; the alkoxynaphthalenes such as methoxynaphthalene and similar alkoxy aromatic compounds.

Typical of the aminating agents are the ammonium halides while the various alkyl aldehydes, formaldehyde, acetaldehyde, propionaldehyde, and butyraldehyde, etc. are the sources of the alkyl groups.

Similarly, trisubstituted methanes may be obtained also by the use of the aliphatic aldehydes of greater molecular weight than formaldehyde.

Thus, it is apparent that the present invention provides a means for preparing aminoalkyl alkoxy aromatic compounds which may be represented by the general formula

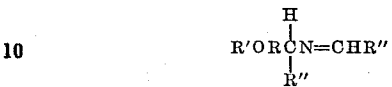

wherein R is the residue of a mono- or polynuclear aromatic hydrocarbon, R′ is an alkyl group and R″ is hydrogen or an alkyl group. It will be understood that R may also be substituted by one or more substituent radicals and as a result thereof the aminoalkylated alkoxy aromatic compound may be represented by the formula:

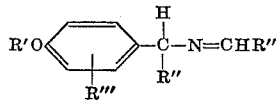

where R‴ is hydrogen or an alkyl group having up to 30 carbon atoms. Similarly the trisubstituted methanes may be represented by the general formula:

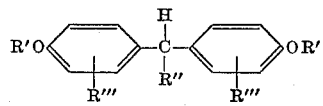

where R′ and R″ have the same significance as assigned hereinbefore and R‴ is hydrogen or an alkyl group having up to 30 carbon atoms.

In general, the method of the present invention comprises reacting an alkyoxy aromatic compound, an aldehyde and an ammonium halide. The reaction, in its simplest form may be represented by the following equation:

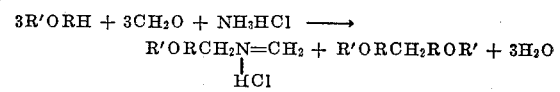

(R and R′ have the same significance as given hereinbefore.) However, when formaldehyde is used the monomeric aminomethylmethoxybenzene is not produced but a trimer is obtained.

Thus, when anisole C$_6$H$_5$OCH$_3$, is reacted with formaldehyde and ammonium halide in acetic acid as a solvent, the N-(p-methoxybenzyl)formaldimine having a melting point of 108°–110° C., and a molecular weight corresponding to the trimer (CH$_3$OC$_6$H$_4$CH$_2$N=CH$_2$)$_3$ is obtained together with di-anisylmethane, CH$_2$(C$_6$H$_5$OCH$_3$)$_2$, having a melting point of 50°–51° C. In the absence of solvent quantities of acetic acid this reaction does not proceed well. Furthermore, sulfurous acid does not appear to catalyze this reaction and in the absence of solvent quantities of acetic acid aminomethylsulfonic acid is produced when sulfur dioxide is passed through the reaction mixture. These latter observations are of interest in view of the direct contrast with the observations reported in copending application for United States Letters Patent Serial No. 781,754, filed October 23, 1947, in the names of John W. Shick and the aforesaid Howard D. Hartough wherein it is shown that phenol reacts with formaldehyde and ammonium chloride in the presence of acids such as sulfurous acid or acid salts of sulfurous acids.

Illustrative of this reaction is the following example:

About fifty-four parts by weight of anisole (0.5 mole), about sixty parts by weight of formaldehyde (2 moles) as trioxymethylene, about fifty-four parts by weight of ammonium chloride (1 mole), about one hundred five parts by weight of acetic acid and about ten parts by weight of water were mixed and rapidly agitated. The mixture was heated until the temperature reached about 73° C. at which time the source of external heat was removed. The temperature fell but later rose to about 77° C. Thereafter the temperature of the reaction mixture was allowed to fall to room temperature and sufficient water added to dissolve the unreacted ammonium chloride. An oily layer, heavier than the aqueous layer, was separated. The oily layer was distilled at a pressure of 96 millimeters of mercury and 3 parts by weight of water and 6 parts by weight of anisole were recovered. The log of the distillation of the residue is given in the following tabulation:

| Fraction No. | Vapor, ° C. | Pressure, mm. of Hg | $n_D^{20}$ | Parts by Weight |
|---|---|---|---|---|
| 1 | 76–86.5 | 0.5 | 1.5478 | 4 |
| 2 | 86.5–149 | 0.2 | 1.5506 | 5 |
| 3 | 149–161 | 0.1 | | 14 |
| 4 | 161–171 | 0.1 | 1.5788 | 5 |
| 5 | 171–181 | 0.1 | 1.5830 | 2 |
| Still Residue | | | | 6 |
| | | | | 36 |

Fraction No. 3 crystallized immediately after distillation. Fractions Nos. 2 and 4 crystallized when seeded with crystals from fraction No. 3. The melting point of the crystals from fraction No. 3 after recrystallization from 95 per cent ethanol was 50.5° to 51.0° C. The analysis of these crystals is compared with the calculated carbon and hydrogen content of dianisylmethane, $C_{15}H_{16}O_2$ in the following tabulation:

| | $C_{15}H_{16}O_2$ | |
|---|---|---|
| | Calculated | Found |
| Carbon, per cent | 78.94 | 78.44 |
| Hydrogen, per cent | 7.02 | 7.24 |

The aqueous layer was neutralized with aqueous caustic soda solution and extracted three times with benzene. The benzene was distilled off at atmospheric pressure and the distillation continued under reduced pressure to obtain a distillate and a still residue. During the distillation the still temperature rose to 223° C., the vapor temperature ranged from 120° to 142° C. at 0.1 millimeter of mercury. Nine parts by weight of distillate and 3 parts by weight of still residue were obtained.

The distillate was such an extremely viscous liquid that it was necessary to warm the condenser to cause the distillate to flow. Upon scratching the container of distillate it crystallized. After four recrystallizations from denatured alcohol (Formula No. 30) the melting point was 108° to 110° C. A comparison of the analysis of these crystals and that calculated for N-(methoxybenzyl)formaldimine, $C_9H_{11}ON$, is provided in the following tabulation:

| | $C_9H_{11}ON$ | |
|---|---|---|
| | Calculated | Found |
| Carbon, per cent | 72.48 | 71.55 |
| Hydrogen, per cent | 7.38 | 7.37 |
| Nitrogen, per cent | 9.39 | 9.39 |
| Molecular weight | 447 | 509 |

Thus, it is apparent that the crystalline product is a polymer, probably a trimer.

Oxidation of the product with alkaline permanganate yielded p-anisic acid,

melting point 181.5° to 183° C. Accordingly, it is manifest that the original product is substituted in the para position and consequently the structural formula is:

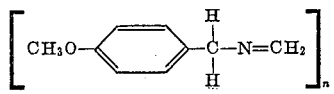

where $n$ is 3.

The foregoing illustrates the application of the principles of the present invention. Therefore, it can be stated that the present method of aminoalkylating alkoxy aromatic compounds comprises reacting an alkoxy aromatic compound with an aldehyde and an ammonium halide in acetic acid as a solvent at temperatures of about 50° to about 100° C. allowing the reaction temperature to fall to room temperature (15°–25° C.), separating an aqueous layer, neutralizing the aqueous layer, extracting the aqueous layer with a solvent for the amino alkylated alkoxy aromatic compound and recovering the amino alkylated alkoxy aromatic compound.

The formaldimines described hereinbefore may be converted into primary amines by treatment with an alcohol, either monohydric or polyhydric, in aqueous acid solution as described in the copending application for United States Letters Patent Serial No. 36,448 filed in the names of Howard D. Hartough and Seymour L. Meisel on July 1, 1948, now U. S. Patent 2,533,798. The formaldimines also can be hydrolyzed at a pH of 3 to 6 to the corresponding aldehyde, anisaldehyde for example, as described in the copending application for United States Letters Patent Serial No. 21,753 filed April 17, 1948, now U. S. Patent 2,543,318 in the name of Howard D. Hartough.

We claim:

1. A method of preparing an N-alkylidene-(alkoxyaryl) alkylamine which comprises mixing an aromatic hydrocarbon having only an alkoxy substituent with at least a molar equivalent of an alkylaldehyde, at least one-third of a molar equivalent of ammonium halide and a solvent amount of acetic acid to form a reaction mixture, maintaining said reaction mixture at a temperature within the range of about 50° to about 100° C., and recovering N-alkylidene-(alkoxyaryl) alkylamine.

2. A method of preparing N-methylidene-(alkoxyaryl) methylamine which comprises mixing an aromatic hydrocarbon having only an alkoxy substituent with at least a molar equivalent of formaldehyde, at least one-third of a molar equivalent of ammonium halide and a solvent amount of acetic acid to form a reaction mixture, maintaining said reaction mixture at a temperature within the range of about 50° to about 100° C., and recovering a polymer of N-methylidene-(alkoxyaryl) methylamine.

3. A method of preparing N-methylidene-(alkoxyphenyl) methylamine which comprises mixing an aromatic hydrocarbon of the benzene series having only an alkoxy substituent with at least a molar equivalent of formaldehyde, at least one-third of a molar equivalent of ammonium chloride and a solvent amount of acetic acid to form a reaction mixture, maintaining said reaction mixture at a temperature within the range of about 50° to about 100° C., and recovering a polymer of N-methylidene-(alkoxyphenyl) methylamine.

4. A method of preparing N-alkylidene-(alkoxyphenyl) alkylamine which comprises mixing an aromatic hydrocarbon of the benzene series having only an alkoxy substituent with at least a molar equivalent of an alkyl aldehyde, at least one-third of a molar equivalent of ammonium halide and a solvent amount of acetic acid to form a reaction mixture, maintaining said reaction mixture at a temperature within the range of about 50° to about 100° C., and recovering N-alkylidene-(alkoxyphenyl) alkylamine.

5. A method of preparing N-alkylidene-(p-methoxyphenyl) alkylamine which comprises mixing anisole with at least a molar equivalent of an alkyl aldehyde, at least one-third of a molar equivalent of ammonium chloride and a solvent amount of acetic acid to form a reaction mixture, maintaining said reaction mixture at a temperature within the range of about 50° and about 100° C., and recovering N-alkylidene-(p-methoxyphenyl) alkylamine.

6. A method of preparing N-methylidene-(p-methoxyphenyl) methylamine which comprises mixing anisole with at least a molar equivalent of formaldehyde, at least one-third of a molar equivalent of ammonium chloride and a solvent amount of acetic acid to form a reaction mixture, maintaining said reaction mixture at a temperature within the range of about 50° to about 100° C., and recovering a polymer of N - methylidene - (p - methoxyphenyl) methylamine.

7. A method of preparing N-methylidene-(p-methoxyphenyl) methylamine which comprises mixing anisole, formaldehyde and ammonium chloride in the molar proportion of 1:4:2 in a solvent amount of acetic acid to form a reaction mixture, maintaining said reaction mixture at a temperature within the range of about 70° to about 80° C., separating said reaction mixture into an aqueous layer and an oily layer, neutralizing said aqueous layer, extracting said neutralized aqueous layer with benzene, distilling said benzene extract, and recovering a trimer of N-methylidene-(p-methoxyphenyl) methylamine.

8. A new composition of matter containing 72.48 per cent carbon, 7.38 per cent hydrogen, and 9.39 per cent nitrogen, having a molecular weight of 447 and having a melting point after 4 recrystallizations from denatured alcohol of 108° to 110° C., said material conforming to the formula

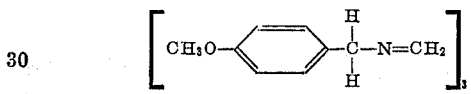

said material when oxidized with alkaline permanganate yielding p-anisic acid having a melting point of 181.5° to 183° C.

HOWARD D. HARTOUGH.
JOSEPH J. DICKERT, Jr.

REFERENCES CITED

The following references are of record in the file of this patent:

Stephen: "J. Chem. Soc." (London), vol. 117 (1920), page 513.

Ter Meer: "Ber. Deut. Chem.," vol. 7 (1874), page 1200.

Quelet: "Comptes Rendus Acad. Sci.," vol. 198 (1934), pp. 102 to 105.

Baltzly et al.: "J. Am. Chem. Soc.," vol. 65 (1943), pp. 1984 to 1992.

De Salas et al.: "J. Chem. Soc." (London), 1938, pp. 319 to 321.